(12) United States Patent
Pierce

(10) Patent No.: US 8,485,536 B1
(45) Date of Patent: Jul. 16, 2013

(54) AUTOMATED ACTUATING SHOCK MOUNT FOR IMPROVED VEHICLE CORNERING

(76) Inventor: Philip S. Pierce, Waterford, WI (US)

(*) Notice: Subject to any disclaimer, the term of this patent is extended or adjusted under 35 U.S.C. 154(b) by 0 days.

(21) Appl. No.: 13/458,511

(22) Filed: Apr. 27, 2012

Related U.S. Application Data

(60) Provisional application No. 61/481,563, filed on May 2, 2011.

(51) Int. Cl.
*B60G 7/00* (2006.01)
(52) U.S. Cl.
USPC .......................................................... 280/5.52
(58) Field of Classification Search
USPC .......... 280/5.52, 5.521, 5.509, 5.51, 124.103, 280/86.751, 86.752, 86.757
See application file for complete search history.

(56) References Cited

U.S. PATENT DOCUMENTS

| | | | | |
|---|---|---|---|---|
| 4,700,972 A | * | 10/1987 | Young | 280/5.521 |
| 6,267,387 B1 | * | 7/2001 | Weiss | 280/5.52 |
| 7,717,438 B2 | * | 5/2010 | Koch et al. | 280/5.508 |
| 2011/0215544 A1 | * | 9/2011 | Rhodig | 280/124.103 |

* cited by examiner

*Primary Examiner* — Faye M. Fleming
(74) *Attorney, Agent, or Firm* — Donald J. Ersler

(57) ABSTRACT

The automated actuating shock mount for improved vehicle cornering preferably includes at least one linear actuation device and a control system. The linear actuation device includes a drive lug and a linear actuation device. The drive lug is modified to form an upper shock mount for the upper end of the vehicle shock. The linear actuation device is attached to the vehicle in the same place as the upper shock mount. The control system controls the actuation of the at least one linear actuation device. The control system may receive a steering input to raise the linear actuation device or input through at least one actuation switch.

16 Claims, 4 Drawing Sheets

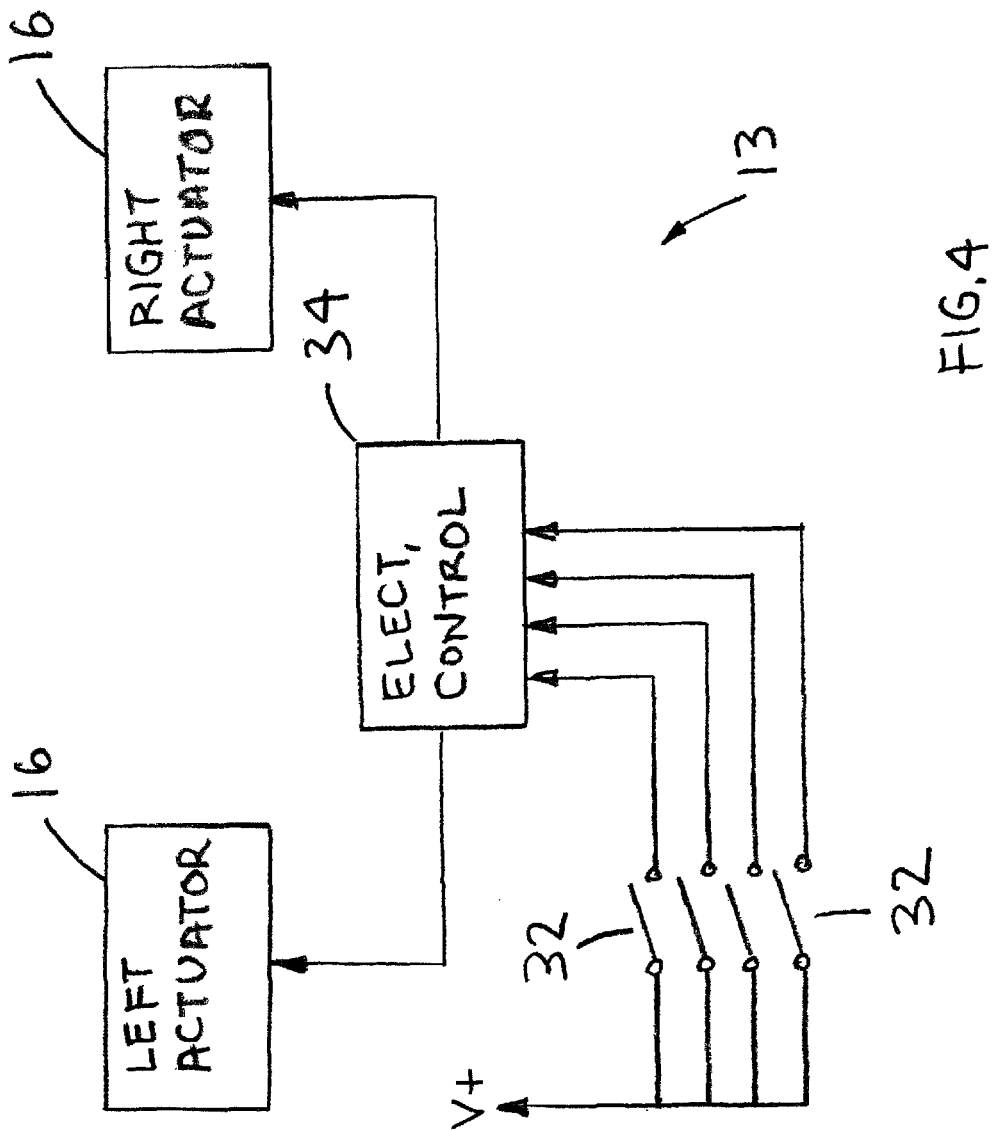

AUTOMATED ACTUATING SHOCK MOUNT FOR IMPROVED VEHICLE CORNERING

CROSS-REFERENCES TO RELATED APPLICATIONS

This is a utility patent application taking priority from provisional application No. 61/481,563 filed on May 2, 2011.

BACKGROUND OF THE INVENTION

1. Field of the Invention

The present invention relates generally to improved vehicle cornering and more specifically to an automated actuating shock mount for improved vehicle cornering, which lowers the center of gravity of a vehicle for improved cornering.

2. Discussion of the Prior Art

It appears that the prior art does not teach or suggest raising an upper shock mount, before or during cornering to improve the cornering performance of a vehicle, such as a snowmobile.

Accordingly, there is a clearly felt need in the art for an automated actuating shock mount for improved vehicle cornering, which includes an automated actuation device for raising an upper shock mount, before or during cornering to lower the center of gravity of a vehicle for improved cornering.

SUMMARY OF THE INVENTION

The present invention provides an automated actuating shock mount for improved vehicle cornering, which lowers the center of gravity of a vehicle for improved cornering. The automated actuating shock mount for improved vehicle cornering (automated actuating shock mount) preferably includes at least one linear actuation device and a control system. The linear actuation device includes a drive lug and a linear actuation device. The linear actuation device includes a housing. The drive lug is modified to form an upper shock mount for the upper end of the vehicle shock. The linear actuation device could be an electric cylinder, a pneumatically operated linear actuation device, a hydraulic operated linear actuation device or any other suitable linear actuation device. Linear actuation devices are well known in the art and need not be described in further detail. Mounting hardware is attached to the housing of the linear actuation device to facilitate attachment to the vehicle.

The control system controls the actuation of the linear actuation device. A first embodiment of the control system includes a steering sensor and an electronic controller. The electronic controller receives an electrical input according to the steering angle of the vehicle. The maximum upward travel of the drive lug is calibrated to the maximum steering angle from a straight steering position to either full left or right turn.

The relationship of steering angle and the height, which the drive lug is raised can be linear or nonlinear. A left or right turn, which is only 50% of the maximum turning angle would result in the drive lug being raised only 50% of the full distance for a linear relationship. A left or right turn, which is only 50% of the maximum turning angle would result in the drive lug being raised some other value, such as 40% or 60% of the full distance for a nonlinear relationship. A second embodiment of the control system includes at least one actuation switch and an electronic controller. Each actuation switch controls the operation of the electronic controller. The actuation switch sends a signal to the electronic controller to raise the linear actuation device some predetermined distance.

Accordingly, it is an object of the present invention to provide an automated actuating shock mount, which includes an automated actuation device for raising an upper shock mount, before or during cornering to lower the center of gravity of a vehicle for improved cornering.

These and additional objects, advantages, features and benefits of the present invention will become apparent from the following specification.

BRIEF DESCRIPTION OF THE DRAWINGS

FIG. 4 is a schematic diagram of using at least one actuation switch and an electronic controller to raise an automated actuating shock mount in accordance with the present invention.

DETAILED DESCRIPTION OF THE PREFERRED EMBODIMENTS

Figure 1:
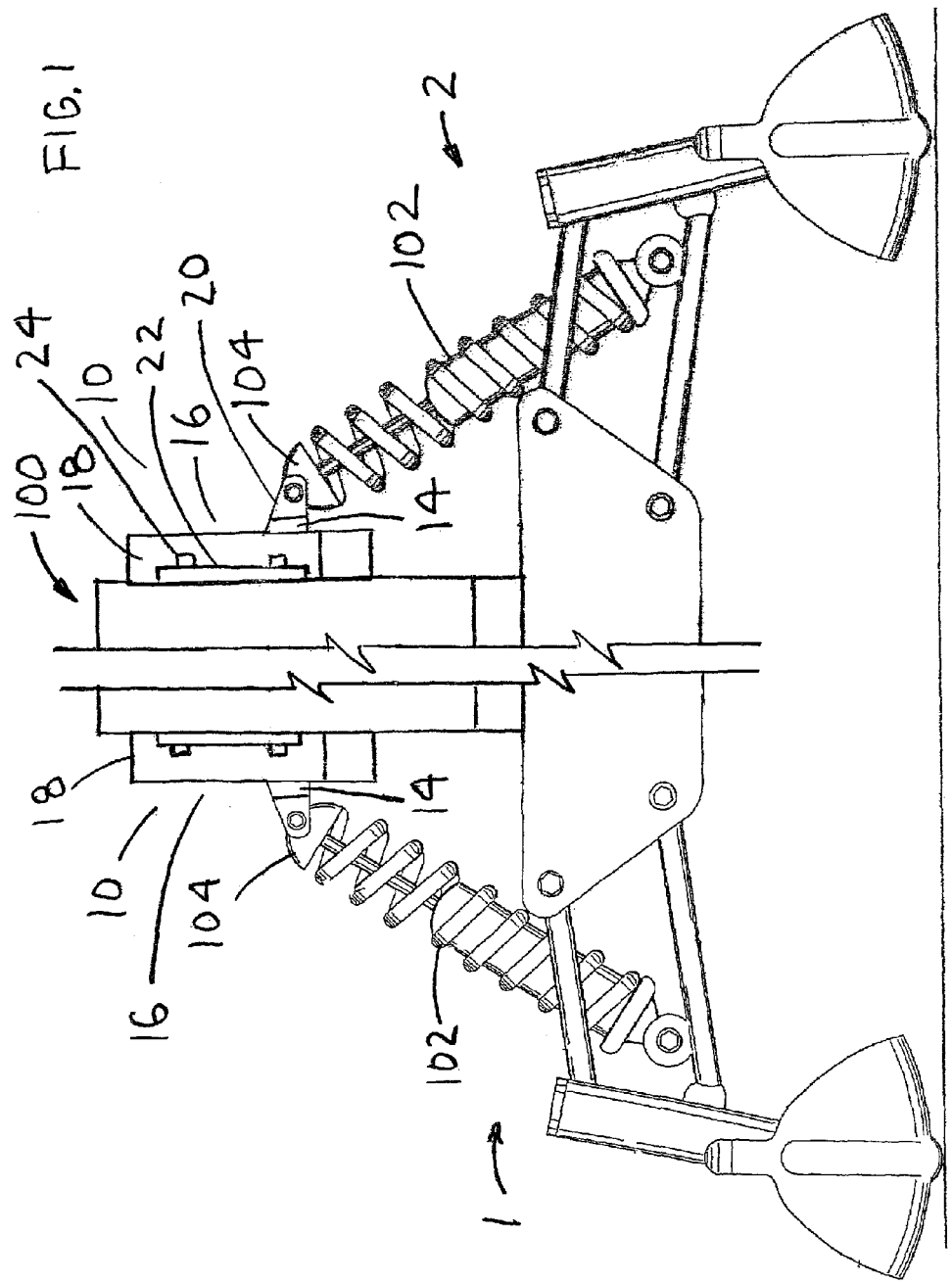
FIG. 1 is a front view of a vehicle with an automated actuating shock mount in accordance with the present invention.
Figure 3:
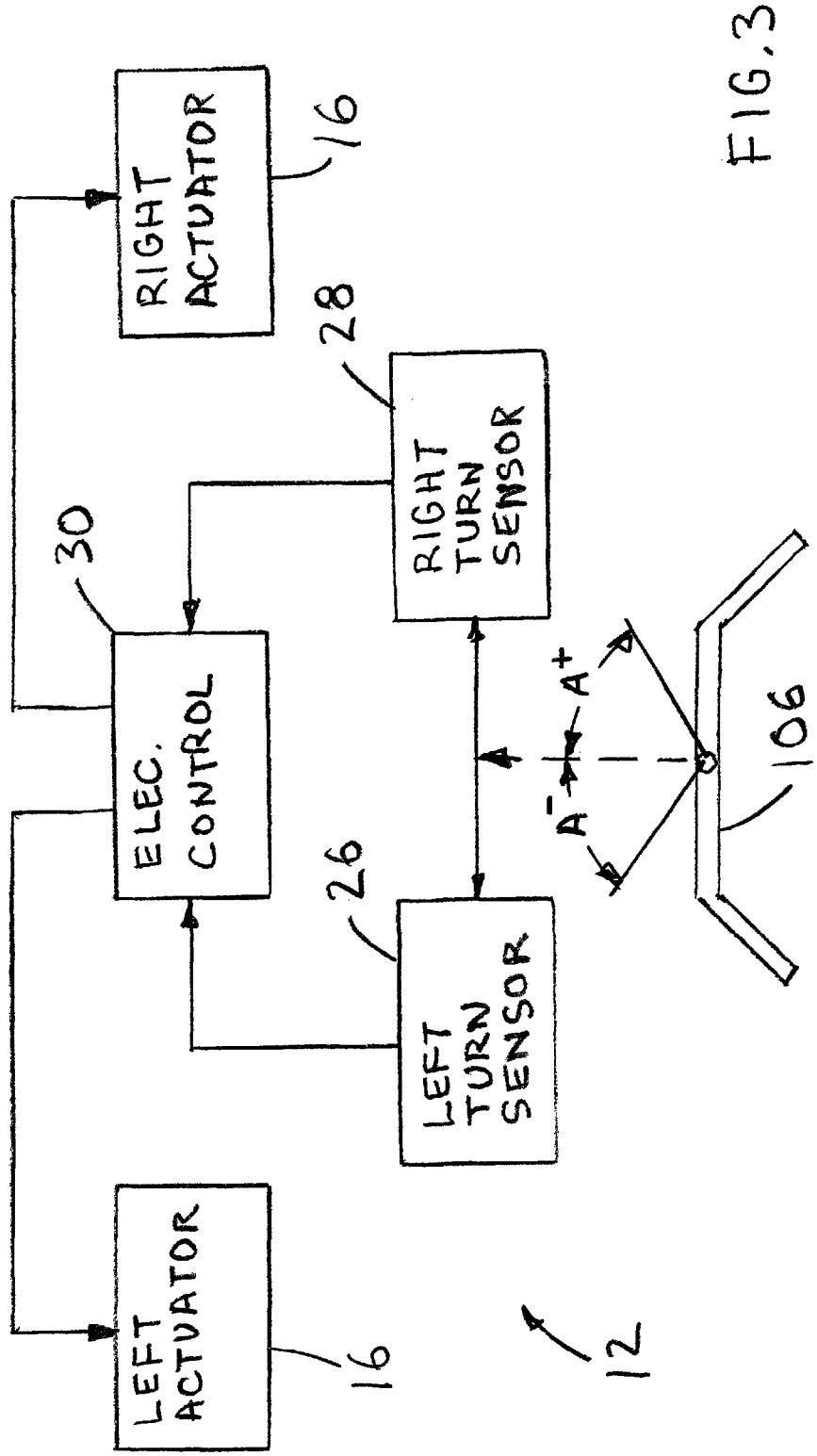
FIG. 3 is a schematic diagram of using a steering wheel and an electronic controller to raise an automated actuating shock mount in accordance with the present invention.

With reference now to the drawings, and particularly to FIG. 1, there is shown a front view of a vehicle, such as a snowmobile 100 with a pair of automated actuating shock mounts 1, 2. With reference to FIGS. 3-4, each automated actuating shock mount 1, 2 preferably includes at least one linear actuation device 10 and a control system 12, 13. The linear actuation device 10 includes a drive lug 14 and a linear actuation device 16. The linear actuation device 16 includes a housing 18. The drive lug 14 is modified to form an upper shock mount 20 for the upper end 104 of the vehicle shock 102. The linear actuation device 16 could be an electric cylinder, a pneumatically operated linear actuation, a hydraulic operated linear actuation or any other suitable linear actuation device. Linear actuation devices are well known in the art and need not be described in further detail. Mounting hardware 22 is attached to the housing 18 of the linear actuation device 16 to facilitate attachment to the vehicle 100 with fasteners 24.

The control system 12, 13 controls the actuation of the linear actuation device 16. A first embodiment of the control system 12 preferably includes a left steering sensor 26, a right steering sensor 28 and an electronic controller 30. The electronic controller 30 receives an electrical input according to the steering angle of the steering wheel 106 of the vehicle 100. The maximum upward travel of the drive lug 14 is calibrated to the maximum steering angle A− or A+ from a straight steering position to either a full left hand or right hand turn.

The relationship of steering angle A+ or A− and the amount that the drive lug 14 is raised could be linear or nonlinear. A left hand turn or right hand turn, which is only 50% of the maximum turning angle A+ or A− would result in the drive lug 14 being raised only 50% of the full distance for a linear relationship. Each steering sensor could be a resistive device, such as a potentiometer that increases or decreases in electrical resistance from a minimum steering angle to a maximum steering angle. However, other types of sensors may also be used. A left hand or right hand turn, which is only 50% of the maximum turning angle would result in the drive lug 14 being raised some value other than 50%, such as 40% or 60% of the full distance for a nonlinear relationship. Each steering sensor could be any suitable type of sensor.

The second embodiment of the control system 13 includes at least one actuation switch 32 and an electronic controller 34. One terminal of each actuation switch 32 is connected to a voltage source V+. The electronic controller 34 includes at least one input port for connection to the other terminal of the at least one actuation switch 32. When one of the at least one actuation switch 32 is closed, one of the at least one input ports of the electronic controller 34 is pulled to V+. Each port is programmed to send a control signal to one of the left and right linear actuation devices 16 for raising thereof to some predetermined height, when one of the at least one port is pulled to V+. Returning the actuation switch 32 to its original position will lower the drive lug 14 to its original orientation.

Figure 2:
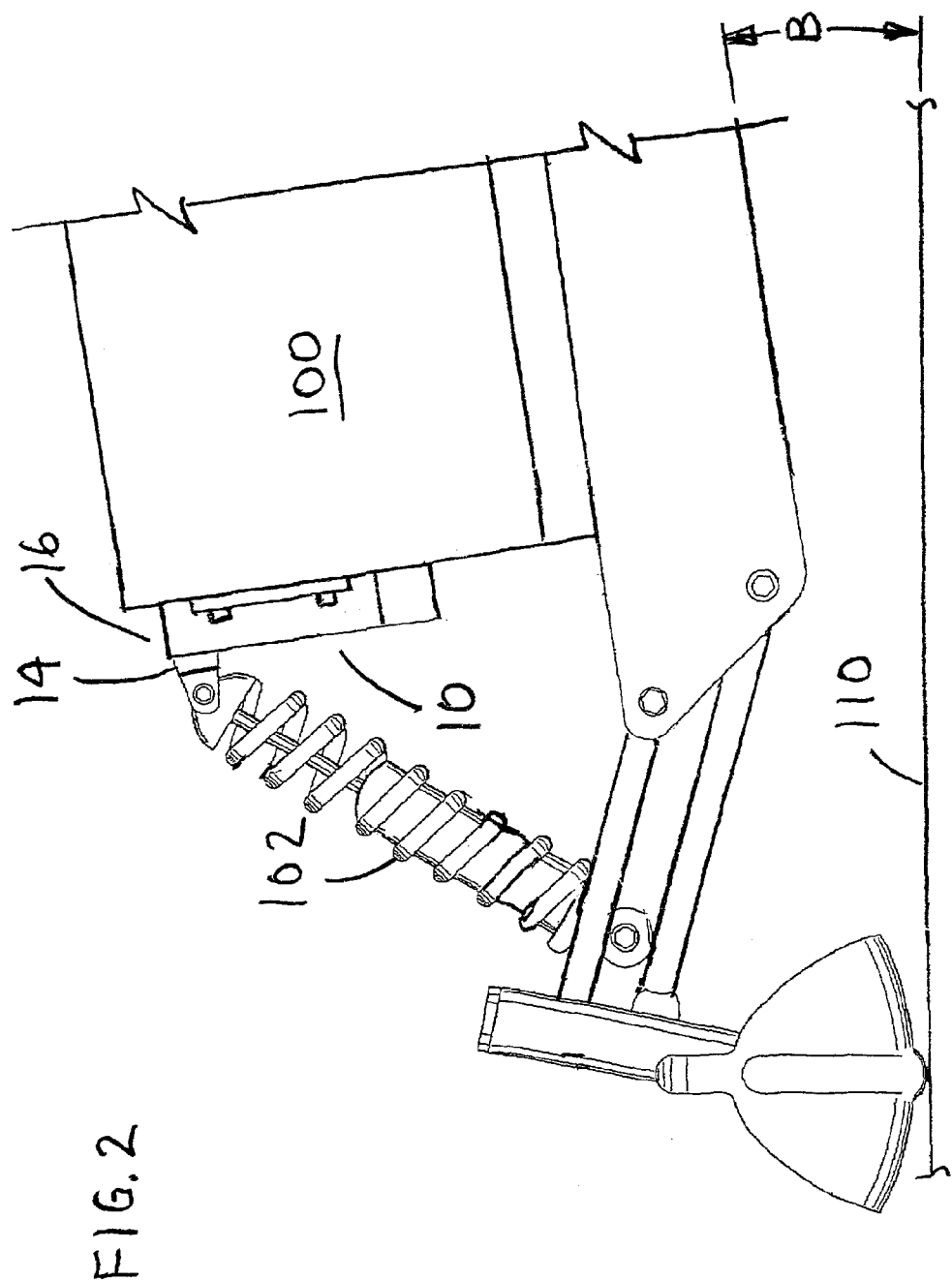
FIG. 2 is an automated actuating shock mount in a raised position in accordance with the present invention.

FIG. 2 shows the result of the linear actuation device 16 being raised to a maximum height. The vehicle 100 forms an acute angle B with a support surface 110, which provides improved cornering for the vehicle 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An automated actuating shock mount comprising:
   at least one linear actuation device, each one of said at least one linear actuation device includes a drive lug;
   a control system for actuating said at least one linear actuation device, said control system receives an electrical signal to move said drive lug, wherein said linear actuation device is mounted to a vehicle instead of an upper shock mount, an upper portion of a shock is mounted to said drive lug, said control system raising said lug in response to said electrical signal; and
   at least one steering sensor for determining the steering angle of a steering wheel, said steering sensor sending said electrical signal to said electronic controller.

2. The automated actuating shock mount of claim 1, further comprising:
   a linear relationship exists between the steering angle and a distance that said drive lug is raised.

3. The automated actuating shock mount of claim 1, further comprising:
   a nonlinear relationship exists between the steering angle and a distance that said drive lug is raised.

4. The automated actuating shock mount of claim 1 wherein:
   said drive lug is modified to form an upper shock mount.

5. The automated actuating shock mount of claim 1 wherein:
   said linear actuation device being one of an electric cylinder, a pneumatically operated linear actuation device and a hydraulic operated linear actuation device.

6. An automated actuating shock mount comprising:
   a first linear actuation device includes a first drive lug, a second linear actuation device includes a second a drive lug;
   a control system for actuating said first and second linear actuation devices, said control system receiving an electrical signal to move one of said first and second drive lugs, wherein said first linear actuation device is mounted to one side of a vehicle instead of a first upper shock mount, said second linear actuation device is mounted to an opposing side of the vehicle instead of a second upper shock mount, upper portions of first and second shocks are mounted to said first and second drive lugs, raising one of said first and second drive lugs in response to said electrical signal; and
   at least one steering sensor for determining the steering angle of a steering wheel, said steering sensor sending said electrical signal to said electronic controller.

7. The automated actuating shock mount of claim 6, further comprising:
   a linear relationship exists between the steering angle and a distance that said drive lug is raised.

8. The automated actuating shock mount of claim 6, further comprising:
   a nonlinear relationship exists between the steering angle and a distance that said drive lug is raised.

9. The automated actuating shock mount of claim 6, further comprising:
   at least one actuation switch is connected to a voltage source, each one of said at least one actuation switch sending said electrical signal to said controller when actuated.

10. The automated actuating shock mount of claim 6 wherein:
    said first and second drive lugs are modified to form first and second upper shock mounts, respectively.

11. The automated actuating shock mount of claim 6 wherein:
    said first and second linear actuation devices are one of an electric cylinder, a pneumatically operated linear actuation device and a hydraulic operated linear actuation device.

12. An automated actuating shock mount comprising:
    at least one linear actuation device, each one of said at least one linear actuation device includes a drive lug;
    a control system for actuating said at least one linear actuation device, said control system receives an electrical signal to move said drive lug, wherein said linear actuation device is mounted to a vehicle instead of an upper shock mount, an upper portion of a shock is mounted to said drive lug, said control system raising said lug in response to said electrical signal; and
    at least one actuation switch is connected to a voltage source, each one of said at least one actuation switch sending said electrical signal to said controller when actuated.

13. The automated actuating shock mount of claim 12, further comprising:
    a linear relationship exists between a steering angle and a distance that said drive lug is raised.

14. The automated actuating shock mount of claim 12, further comprising:
    a nonlinear relationship exists between a steering angle and a distance that said drive lug is raised.

15. The automated actuating shock mount of claim 12 wherein:
    said drive lug is modified to form an upper shock mount.

16. The automated actuating shock mount of claim 12 wherein:
    said linear actuation device being one of an electric cylinder, a pneumatically operated linear actuation device and a hydraulic operated linear actuation device.

* * * * *